United States Patent
Nakano

(10) Patent No.: US 8,115,955 B2
(45) Date of Patent: *Feb. 14, 2012

(54) COMMUNICATION DEVICE

(75) Inventor: Keiichi Nakano, Komaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1022 days.

This patent is subject to a terminal disclaimer.

(21) Appl. No.: 12/039,003

(22) Filed: Feb. 28, 2008

(65) Prior Publication Data

US 2008/0204817 A1 Aug. 28, 2008

(30) Foreign Application Priority Data

Feb. 28, 2007 (JP) .................. 2007-048496

(51) Int. Cl.
*G06F 3/12* (2006.01)

(52) U.S. Cl. ....... 358/1.15; 358/403; 358/435; 399/366; 399/80; 340/572.1

(58) Field of Classification Search ............... 358/3.28, 358/1.15, 468, 435, 402, 403, 461, 474, 518, 358/401; 235/492; 340/572, 118, 10.1; 399/366, 399/391, 80, 405

See application file for complete search history.

(56) References Cited

U.S. PATENT DOCUMENTS

| | | | |
|---|---|---|---|
| 6,597,465 B1 * | 7/2003 | Jarchow et al. | 358/1.12 |
| 6,700,683 B1 * | 3/2004 | Hashizume | 358/461 |
| 6,704,457 B1 * | 3/2004 | Sugiura | 382/274 |
| 6,801,670 B2 * | 10/2004 | Kijima et al. | 382/274 |
| 6,827,279 B2 * | 12/2004 | Teraura | 235/492 |
| 7,405,662 B2 * | 7/2008 | Steinke et al. | 340/572.4 |
| 7,957,020 B2 * | 6/2011 | Mine et al. | 358/1.15 |
| 7,979,019 B2 * | 7/2011 | Yoshino | 399/366 |
| 2002/0170973 A1 | 11/2002 | Teraura | |
| 2004/0257601 A1 * | 12/2004 | Tomiyasu et al. | 358/1.9 |
| 2005/0105920 A1 | 5/2005 | Matsunaga | |
| 2006/0176510 A1 | 8/2006 | Nishizawa | |
| 2006/0215228 A1 * | 9/2006 | Inaba | 358/3.28 |
| 2006/0220859 A1 * | 10/2006 | Nagai et al. | 340/572.1 |
| 2007/0080786 A1 * | 4/2007 | Kusumi | 340/10.1 |
| 2008/0204802 A1 * | 8/2008 | Tanimoto | 358/1.15 |
| 2008/0239379 A1 * | 10/2008 | Ito | 358/1.15 |
| 2008/0239406 A1 * | 10/2008 | Nakano | 358/401 |
| 2008/0239408 A1 * | 10/2008 | Urakawa | 358/435 |

FOREIGN PATENT DOCUMENTS

| | | |
|---|---|---|
| JP | 2002-337426 A | 11/2002 |
| JP | 2005348027 A | 12/2005 |
| JP | 2006-217298 A | 8/2006 |

OTHER PUBLICATIONS

Japan Patent Office, Japanese Office Action in Japanese Patent Application No. 2007-048496 (counterpart to the above-captioned U.S. Patent Application) mailed Feb. 17, 2009.
European Patent Office, European Search Report for Related EP Application No. 08003685 dated Jun. 10, 2008.

* cited by examiner

*Primary Examiner* — Negussie Worku
(74) *Attorney, Agent, or Firm* — Baker Botts L.L.P.

(57) ABSTRACT

A communication device has a reading unit, a wireless tag reading unit, and a transmitting unit. The reading unit reads image data from an original document. The original document has a first wireless tag including wireless tag data. The wireless tag data has data size. The wireless tag reading unit reads the wireless tag data from the wireless tag. The transmitting unit associates the image data with the wireless tag data to transmit the associated image data and wireless tag data to another device.

12 Claims, 8 Drawing Sheets

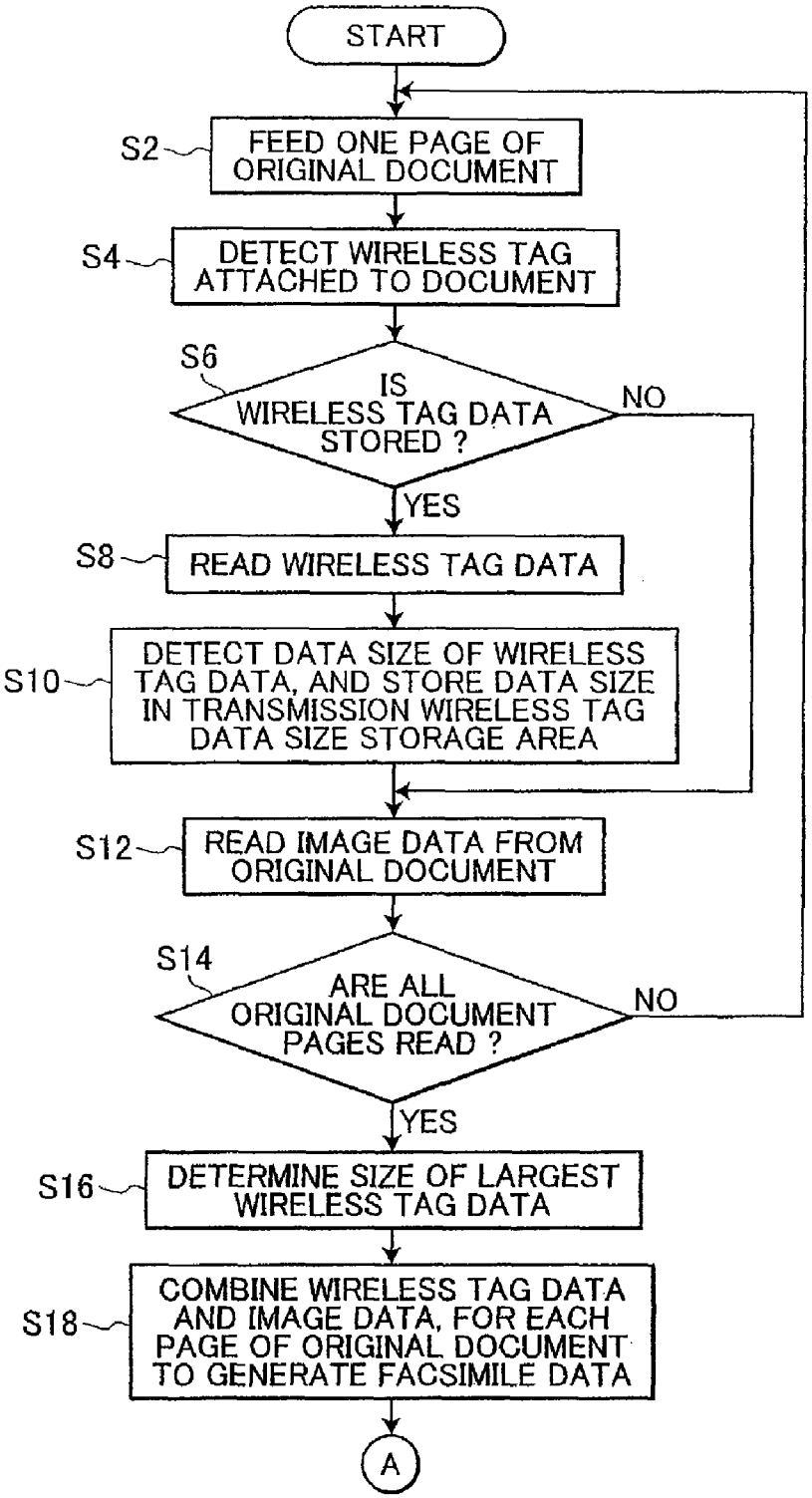

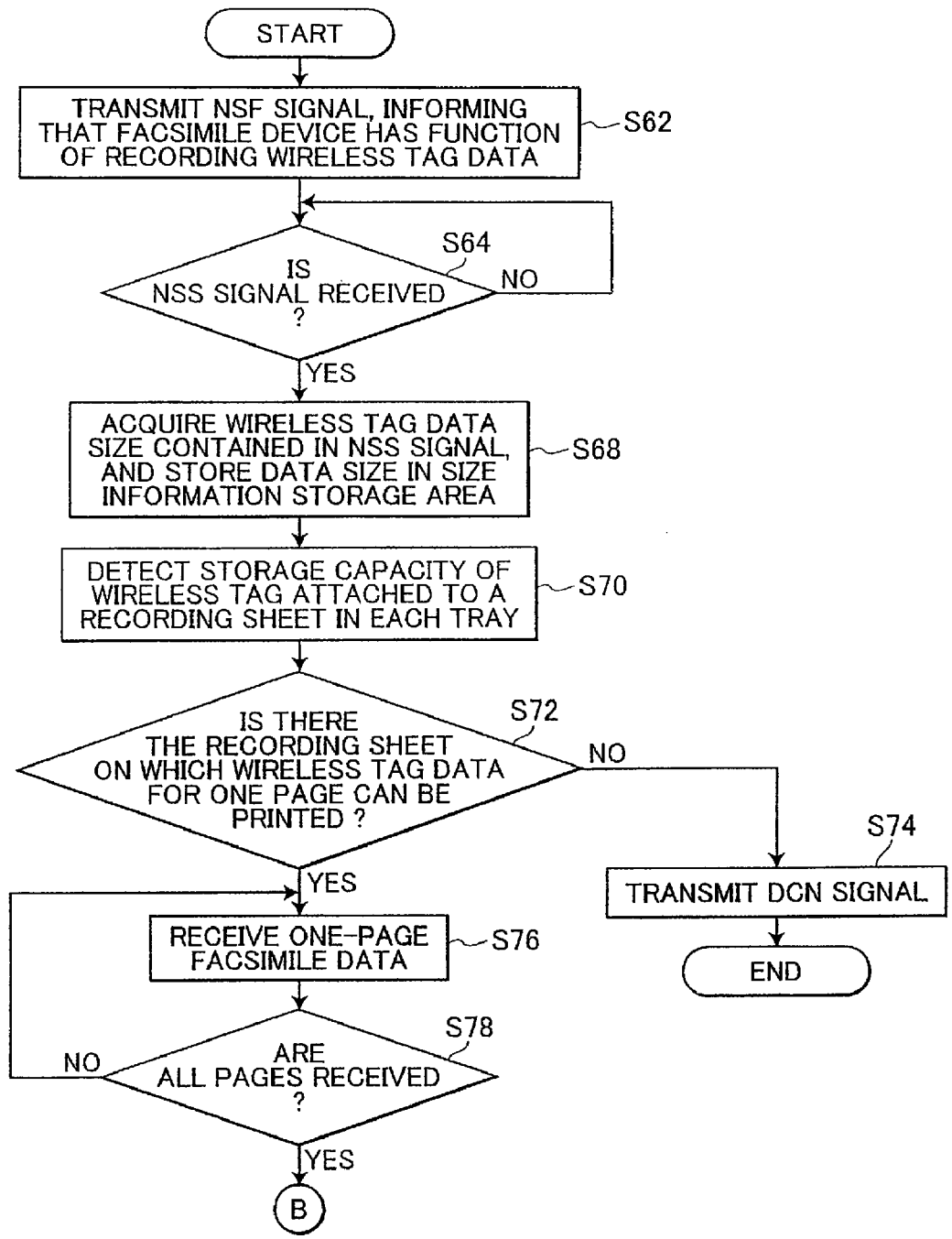

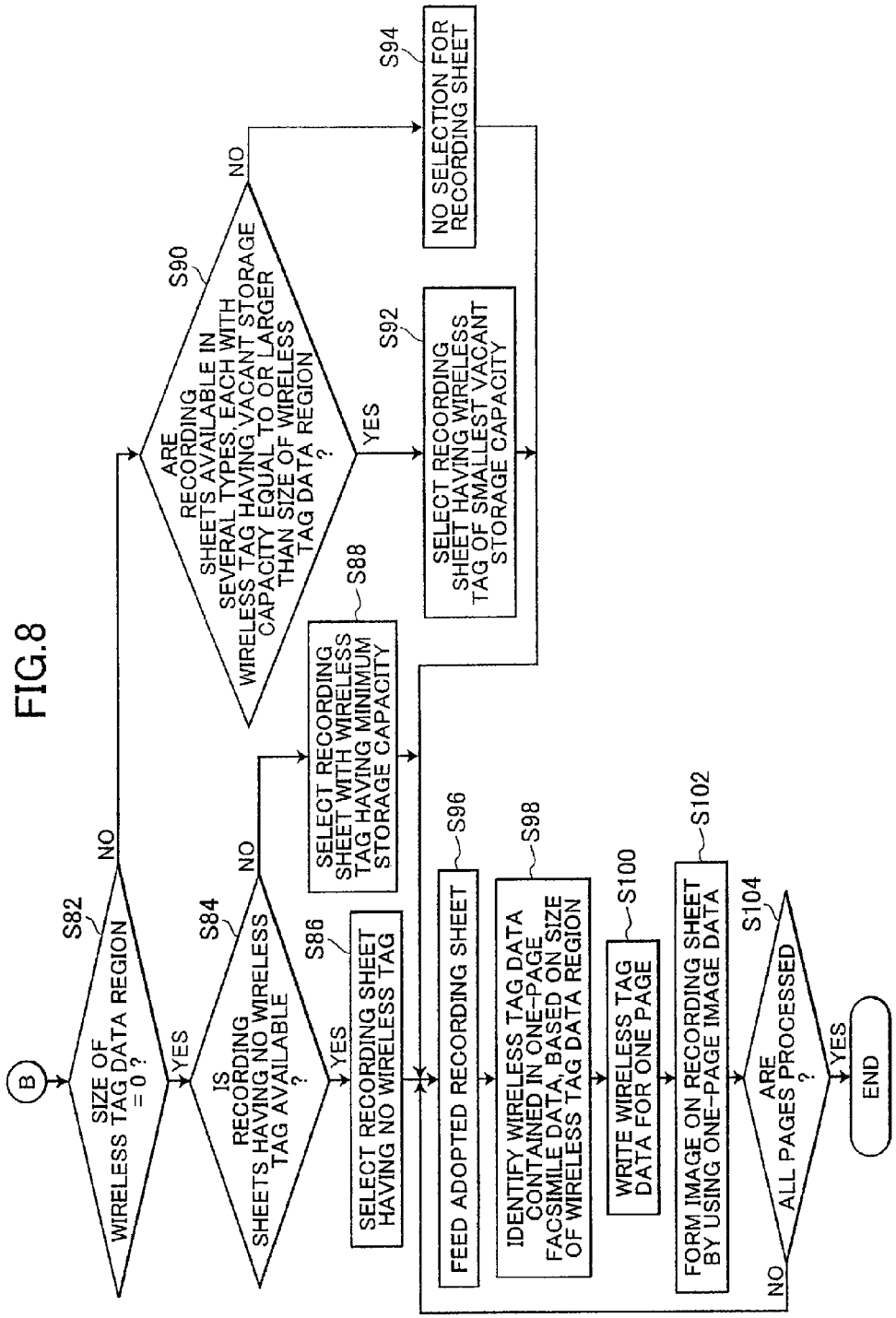

COMMUNICATION DEVICE

CROSS REFERENCE TO RELATED APPLICATIONS

This application claims priority from Japanese Patent Application No. 2007-048496 filed Feb. 28, 2007. The entire content of the priority application is incorporated herein by reference.

TECHNICAL FIELD

The present invention relates to a communication device. More particularly, the invention relates to a communication device that can transmit and receive image data and wireless tag data when the wireless tag data is associated with the image data.

BACKGROUND

Japanese Patent Application Publication No. 2005-348027 discloses a communication terminal device that can read data telephone number and facsimile number from a wireless tag embedded in a business card for communication.

However, the disclosed technology does not propose any specific method for transmitting and/or receiving the data recorded in the wireless tag through the communication networks. In view of this, the disclosed technology does not fully utilize wireless tag.

SUMMARY

An object of the invention is to provide a communication device that transmits and receives image data and wireless tag data, forms an image on a recording medium based on the image data, and writes wireless tag data into the wireless tag attached to the recording medium.

The present invention provides a communication device having a reading unit, a wireless tag reading unit, and a transmitting unit. The reading unit reads image data from an original document. The original document has a first wireless tag including wireless tag data. The wireless tag data has data size. The wireless tag reading unit reads the wireless tag data from the wireless tag. The transmitting unit associates the image data with the wireless tag data to transmit the associated image data and wireless tag data to another device.

The present invention provides a communication device having a receiving unit, an image-forming unit, and a wireless tag writing unit. The receiving unit receives data including image data. The image-forming unit forms an image on a recording medium based on the image data. The recording medium includes a wireless tag having a storage capacity. The wireless tag writing unit writes the wireless tag data into the wireless tag of the recording medium, if the data includes wireless tag data associated with the image data.

BRIEF DESCRIPTION OF THE DRAWINGS

The particular features and advantages of the invention as well as other objects will become apparent from the following description taken in connection with the accompanying drawings, in which:

FIG. 5 is a flowchart showing a former part of a facsimile-transmission procedure;

FIG. 7 is a flowchart showing a former part of a facsimile reception procedure; and FIG. 8 is a flowchart showing a latter part of the facsimile reception procedure.

DETAILED DESCRIPTION

Figure 1:
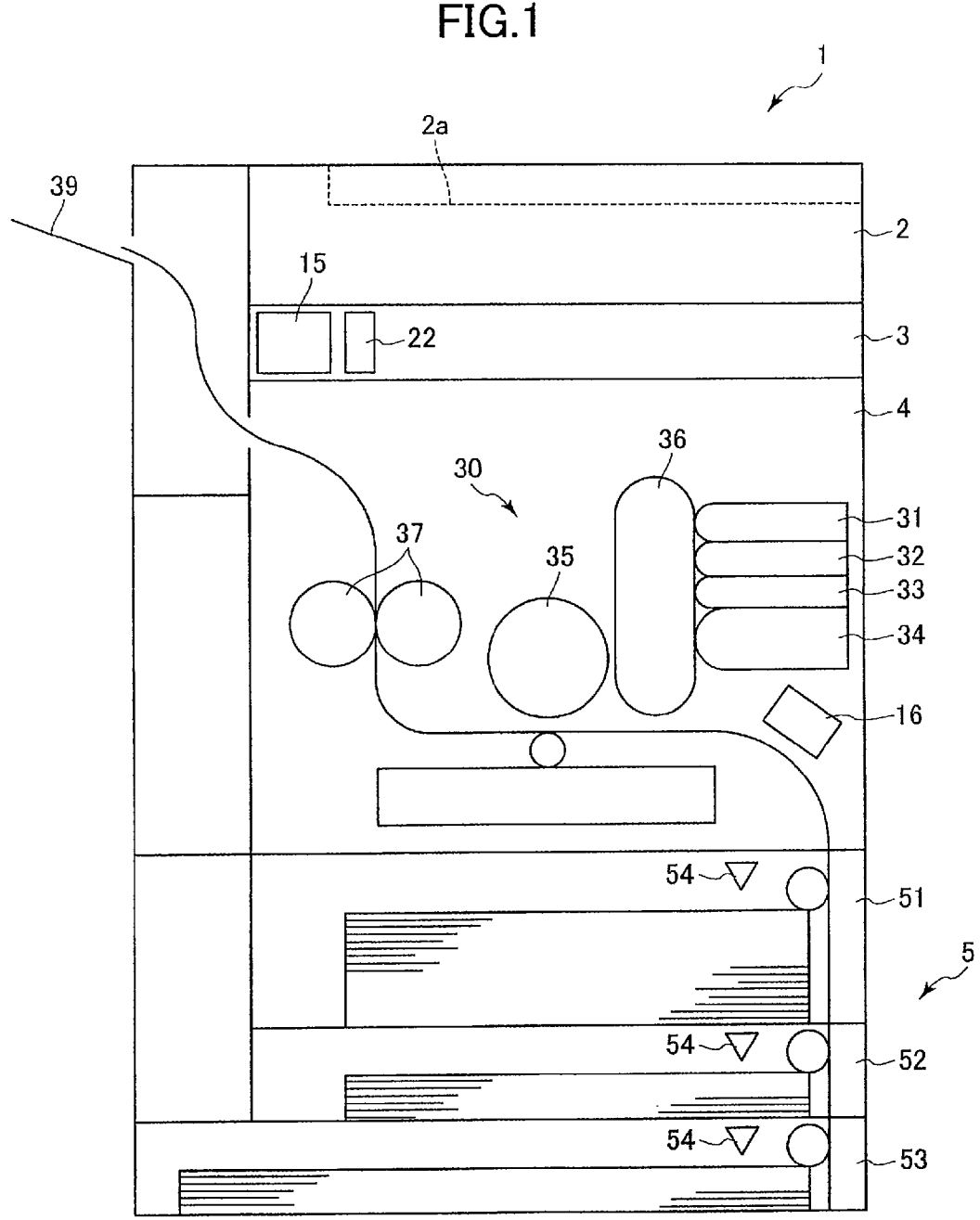
FIG. 1 is a schematic sectional view of a facsimile device of an embodiment according to the present invention.

An embodiment of the present invention will be described, with reference to the accompanying drawings. Referring to FIG. 1, a facsimile device 1 has an automatic document feeder 2, a scanner unit 3, a printer unit 4, and a sheet-feeding tray unit 5.

The automatic document feeder 2 has a document table unit 2a. An original document to be sent by facsimile is placed on the document table unit 2a with the surface thereof facing downward. When a user pushes a start key (not shown) provided on the facsimile device 1, the original document is fed page by page to the scanner unit 3. After the scanner unit 3 has read data from each page, the original document is ejected through a document-ejecting port (not shown).

The scanner unit 3 has a wireless tag reader 15 and a scanner 22. The wireless tag reader 15 reads data recorded in a wireless tag attached to the original document by wireless. The scanner 22 reads image data from the original document. In this embodiment, the wireless tag is a recording medium on which data is written and read without physically contacting therewith and called as an IC tag or a radio frequency identification tag (RFID). The "wireless tag attached to an original document" means not only a wireless tag affixed to the document, but also, for example, a wireless tag embedded in the document.

The printer unit 4 has a wireless tag writer 16 and a laser printer 30. The wireless tag writer 16 is configured to write data in a wireless tag attached to a recording sheet fed from the sheet-feeding tray unit 5. The laser printer 30 has a yellow (Y) station 31, a magenta (M) station 32, a cyan (C) station 33, and a black (K) station 34. The Y station 31 contains yellow toner, the M station 32 contains magenta toner, the C station 33 contains cyan toner, and the K station 34 contains black toner. The laser printer 30 further has a transfer drum 35, an intermediate-transfer belt 36, and fixing rollers 37. The intermediate-transfer belt 36 transfers toner from the stations 31, 32, 33 and 34 to the transfer drum 35. Any recording sheet to which the image is formed by the laser printer 30 is ejected onto an ejected sheet stacker 39.

The sheet-feeding tray unit 5 has three sheet-feeding trays 51, 52 and 53. Each of the sheet-feeding trays 51, 52 and 53 has a sensor 54. The sensor 54 detects whether the wireless tag is attached to the sheet accommodated in the sheet-feeding trays 51, 52 and 53. If the wireless tag is attached to the sheet, the sensor 54 detects a vacant writing capacity of the wireless tag. In other words, the sensor 54 can detect how much data can be written in the wireless tag that is attached to the recording sheet accommodated in the sheet-feeding tray.

Figure 2:
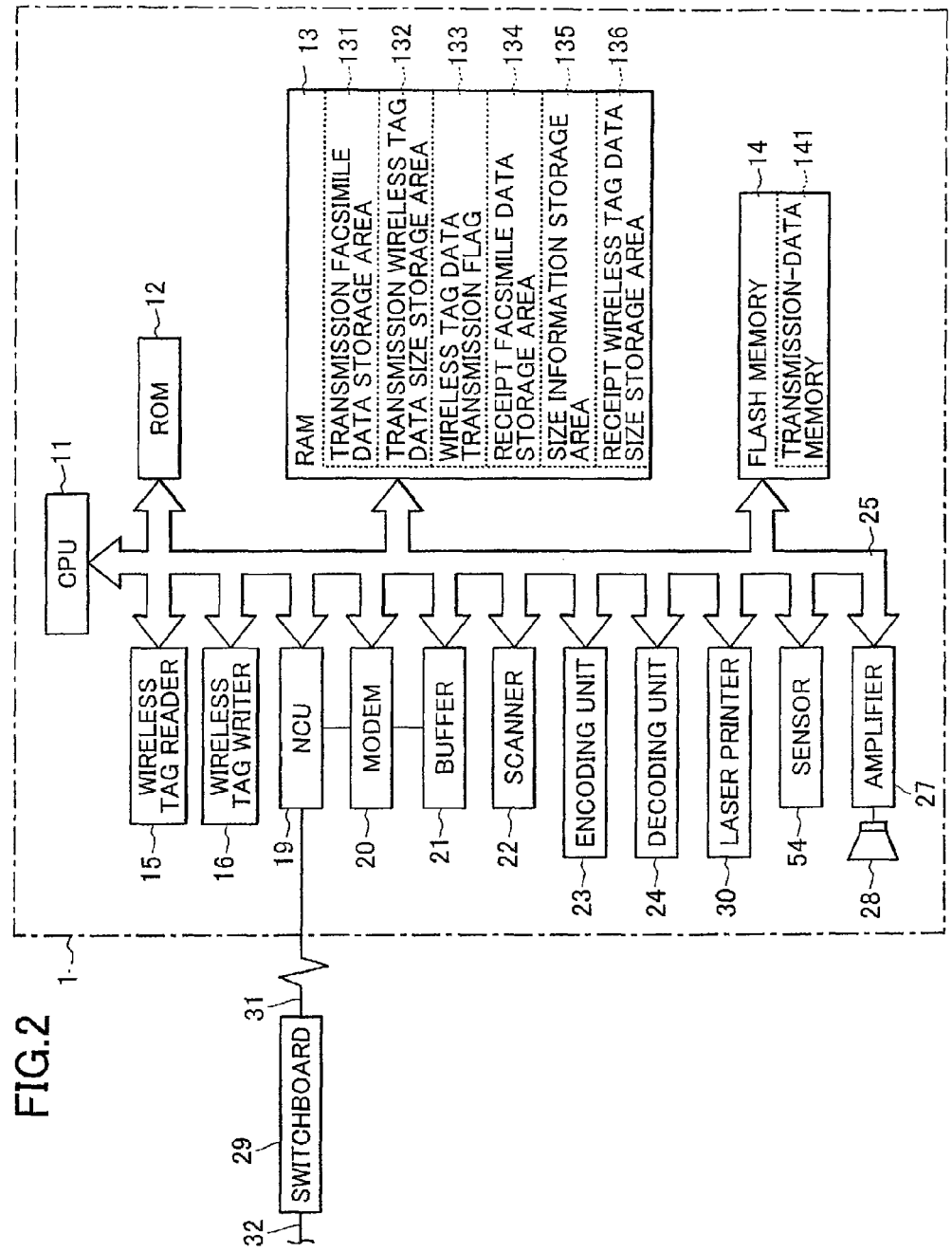
FIG. 2 is a block diagram showing a control system of the facsimile device.

Referring to FIG. 2, the facsimile device 1 has a CPU 11, a ROM 12, a RAM 13, a flash memory 14, the wireless tag reader 15, the wireless tag writer 16, a network control unit 19 (hereinafter referred to as "NCU"), a modem 20, a buffer 21, the scanner 22, an encoding unit 23, a decoding unit 24, the laser printer 30, the sensor 54, and an amplifier 27. These components are connected through a bus line 25.

The CPU 11 receives various signals from the NCU 19 which performs line control and supplies signals to other components of the device 1 through the bus line 25, controlling these components. That is, the CPU 11 performs data communication. The ROM 12 is not rewritable, and stores control programs that are executed by the CPU 11. More specifically, the ROM 12 stores the programs represented as the flowcharts of FIGS. 5 to 7.

The RAM 13 is a memory that temporarily stores various data while the facsimile device 1 is operating. The RAM 13 has a transmission facsimile data storage area 131, a transmission wireless tag data size storage area 132, a wireless tag data transmission flag 133, a receipt facsimile data storage area 134, a size information storage area 135, and a receipt wireless tag data size storage area 136.

The various data stored in the RAM 13 will be described with reference to FIGS. 3A and 3B.

Figure 3A:
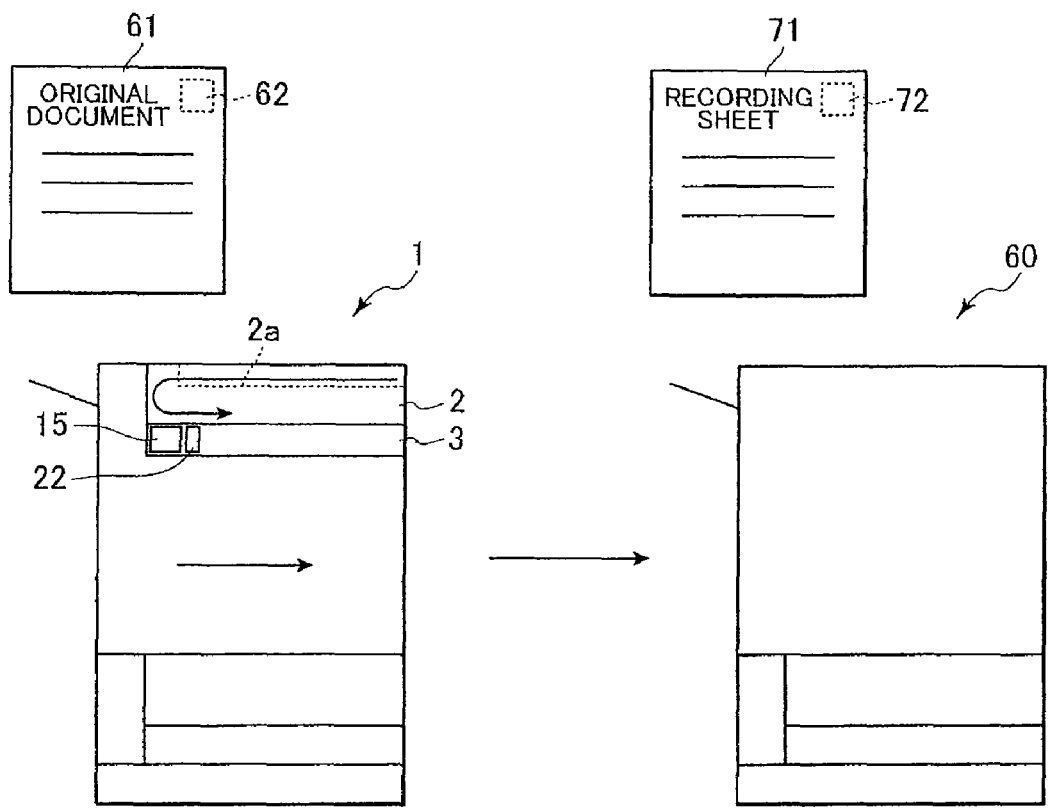
FIG. 3A is a schematic view illustrating communication between two facsimile devices.

As shown in FIG. 3A, an image (including figures and characters) is printed on an original document 61 that is to be transmitted from the facsimile device 1. Further, a wireless tag 62 is embedded in the original document 61. The original document 61 is set on automatic document feeder 2 and is fed, page by page, to the reading position in the scanner unit 3. Then, the wireless tag reader 15 provided in the scanner unit 3 reads data from the wireless tag 62 attached to the original document 61. Thus, the scanner 22 reads the image data from the original document 61. Hereinafter, the data that the wireless tag reader 15 reads from the wireless tag 62 is referred to as wireless tag data.

Figure 3B:
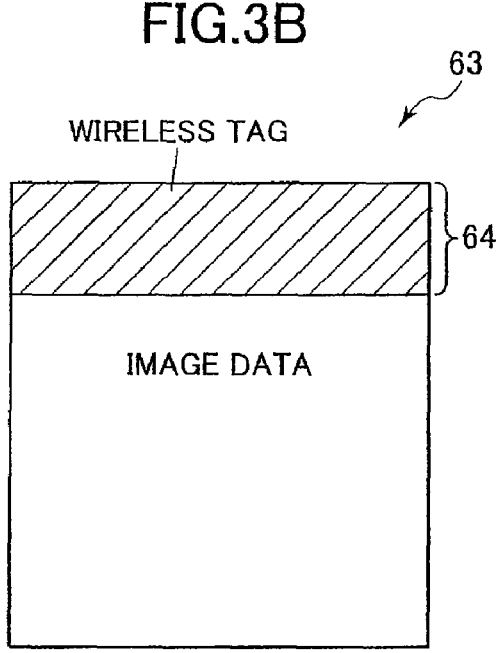
FIG. 3B is a diagram showing one-page facsimile data including wireless tag data and image data.

As shown in FIG. 3B, the facsimile data 63 is composed of wireless tag data and image data which are associated with each other in the same page. When the facsimile data 63 is transmitted to the communication device 60 having the same configuration as that of the facsimile device 1, the device 60 prints an image on a recording sheet 71 (see FIG. 3A), using the image data contained in the facsimile data 63. Further, the communication device 60 writes the wireless tag data contained the facsimile data 63 into the wireless tag 72 attached to the recording sheet 71. Thus, the image on the original document 61 and the wireless tag data in the wireless tag 62 attached to the original document 61 are transmitted from the facsimile device 1 to the communication device 60 and reproduced on the recording sheet 71 at the communication device 60 on a page basis. In this case the wireless tag 62 is written into the wireless tag 72 embedded in the recording sheet 71.

As shown in FIG. 3B, in the one-page facsimile data 63, the wireless tag data precedes the image data. Thus, only the image data is preventing from transmitting when any trouble occurs and the transmission of the facsimile data 63 from the facsimile device 1 to the communication device 60 is inevitably interrupted. The wireless tag data for each page can be reliably transmitted by facsimile If the communication device 60 receives only the image data without receiving the wireless tag data that contains important information showing, for example, how to manage the image data, the image data might be managed in an improper manner in the communication device 60. This is why the wireless tag data should be transmitted prior to the image data.

The facsimile data 63 of each page includes a wireless tag data region 64 of a prescribed size. That is, the wireless tag data region 64 in which the wireless tag data should be stored has a fixed size. Therefore, the communication device 60 can easily separate the wireless tag data from the image data, though the size of the wireless tag data may differ, from page to page.

The wireless tag data region 64 has a size that is equal to the maximum size that the wireless tag data of one page can have. Hence, the wireless tag data of any page can be reliably stored and the facsimile data 63 can have the minimum size to be required. In that part of the wireless tag data region 64, which remains vacant after the wireless tag data has been stored, dummy data is stored, thereby generating the facsimile data 63.

The wireless tag data is associated with the pages of the original document, respectively, and may have a uniform size. In this case, the uniform data size corresponds to the maximum size. If the wireless tag data is associated with only one page of the original document, the size of this wireless tag data corresponds to the maximum size.

Before transmitting the image data 63 from the facsimile device 1 to the communication device 60, the facsimile device 1 notifies the device 60 of the size information representing the data size 64 of the wireless tag data.

Upon receiving the facsimile data 63, the communication device 60 classifies the facsimile data 63 in accordance with the data-size information to specify the wireless tag data of each page.

The facsimile device 1 will be further described with reference to FIG. 2. The transmission facsimile data storage area 131 is a storage area for storing the facsimile data 63 (see FIG. 3B) made from the image data and the wireless tag data. The transmission wireless tag data size storage area 132 is a storage area for storing, for each page, the data representing the size of the wireless tag data read by the wireless tag reader 15.

The wireless tag data transmission flag 133 is a flag that indicates whether the communication device 60 has the function of writing the wireless tag data. The facsimile device 1 processes the image data and the wireless tag data in order to perform facsimile transmission, depending on whether the device 60 can write the wireless tag data to the wireless tag. The operation of the facsimile device 1 will be explained later in detail with reference to FIG. 5.

The reception facsimile data storage area 134 is a storage area for storing the received facsimile data 63. The facsimile data 63 is erased from the reception facsimile data storage area 134 after the image data based on the image data has been formed on the recording sheet 71 and the wireless tag data has been written in the wireless tag 72 attached to the recording sheet 71. If no recording sheets 71 attached with a wireless tag 72 are available, the facsimile data 63 is not erased, remaining saved in the received facsimile data storage area 134.

The flash memory 14 is a writable nonvolatile memory, and includes a transmission-data memory 141 for storing transmission data. As will be described later, the image data ready by the scanner 22 is stored in the transmission-data memory 141 if the transmission of the facsimile data to the communication device 60 is inhibited.

The wireless tag reader 15 is designed to read data from a wireless tag. The wireless tag writer 16 is configured to write data into a wireless tag.

Figure 4A:
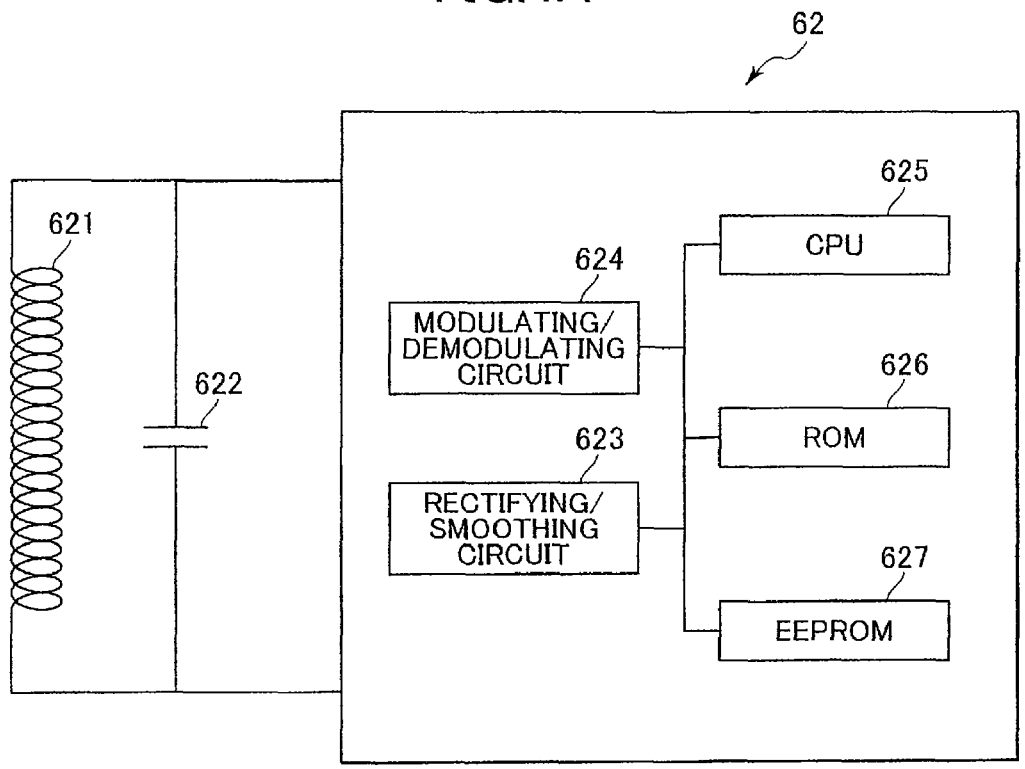
FIG. 4A is a circuit diagram showing a wireless tag.

The wireless tag 62, wireless tag reader 15 and wireless tag writer 16 will be described with reference to FIGS. 4A and 4B. Note that, the wireless tag 72 attached to the recoding sheet 71 described with reference to FIG. 3A has the same configuration as the wireless tag 62. As shown in FIG. 4A, the wireless tag 62 has an antenna coil 621, a resonance capacitor 622, a rectifying/smoothing circuit 623, a modulating/demodulating circuit 624, a CPU 625, a ROM 626, and an EEPROM 627. The antenna coil 621 is connected in parallel to the resonance capacitor 622, whereby the coil 621 and the capacitor 622 constitute a resonance circuit. The resonance circuit receives a power radio signal transmitted from the wireless tag reader 15 or wireless tag writer 16 and having a prescribed high frequency. The power radio signal is supplied to the rectifying/smoothing circuit 623.

The rectifying/smoothing circuit 623, which constitutes a power-supply circuit, receives the power radio signal from the resonance circuit. The circuit 623 rectifies and smoothes the power radio signal, generating a DC power of a specific voltage. The DC power is supplied to the CPU 625.

The signal transmitted from the wireless tag reader 15 or wireless tag writer 16 is superposed on the power radio signal, is demodulated by the modulating/demodulating circuit 624, and is supplied to the CPU 625.

The CPU 625 operates in accordance with the operating program stored in the ROM 626, performing a process using the signal input from the modulating/demodulating circuit 624. Thus, the CPU 625 writes the data received into the EEPROM 627 or read data from the EEPROM 627. The data read from the EEPROM 627 is modulated by the modulating/demodulating circuit 624 and transmitted as a radio signal from the antenna coil 621.

In the wireless tag 62, the rectifying/smoothing circuit 623, the modulating/demodulating circuit 624, the CPU 625, the ROM 626 and the EEPROM 627 are provided in the form of an IC chip. The IC chip is embedded in a recording sheet, together with the antenna coil 621.

Figure 4B:
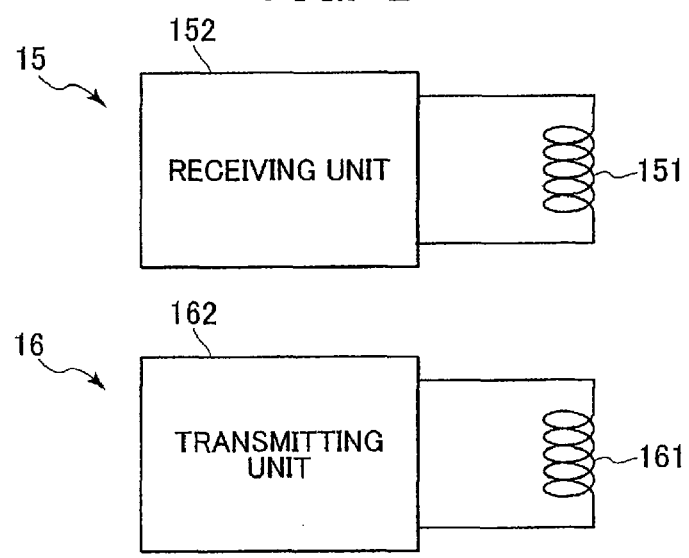
FIG. 4B is a block diagram illustrating a wireless tag reader and a wireless tag writer.

As shown in FIG. 4B, the wireless tag reader 15 has a receiving unit 152 that has a receiving-antenna coil 151, and wireless tag writer 16 has a transmitting unit 162 that has a transmitting-antenna coil 161.

In the wireless tag reader 15, the receiving-antenna coil 151 receives a radio signal transmitted from the wireless tag 62. The receiving unit 152 demodulates the radio signal and discriminates the signal as wireless tag data. Thus, the wireless tag reader 15 reads the wireless tag data from the wireless tag 62.

In the wireless tag writer 16, the transmitting unit 162 modulates a carrier signal, and the transmitting-antenna coil 161 transmits the modulated carrier signal as a power radio signal. Thereafter, the transmitting unit 162 modulates the wireless tag data to be transmitted, and superposes the same on the power radio signal. The transmitting-antenna coil 161 transmits the wireless tag data thus superposed. Thus, the wireless tag writer 16 can write the wireless tag data into the wireless tag 62.

Description will be made again with reference to FIG. 2. The modem 20 is configured to modulate and demodulate the facsimile data 63 and to transmit and receive various sequence signals for use in transmission control. The buffer 21 temporarily stores data that contains coded facsimile data received from and to be transmitted to, the facsimile device provided in the communication device.

The encoding unit 23 is configured to encode facsimile data 63. The decoding unit 24 is designed to read the received data from the buffer 21 and decode the same. The amplifier 27 is connected to a speaker 28. The speaker 28 can generate a calling tone.

The NCU 19 of the facsimile device 1 is connected to a telephone line 31. The telephone line 31 is connected to the switchboard 29 of the facsimile device 1. The switchboard 29 is connected by a telephone line 32 to the switchboard of the communication device 60. Thus, the facsimile device 1 is connected to the communication device 60 through a telephone line.

How the facsimile device 1 configured as described above performs facsimile transmission will be explained, with reference to FIG. 5. The facsimile transmission is started when the user pushes the start key (not shown) after the user places an original document on the document table unit 2a of the automatic document feeder 2 and then inputs the facsimile number of the communication device 60.

First, the automatic document feeder 2 feeds one page of the original document (Step S2). The wireless tag reader 15 detects the wireless tag 62 attached to the document (Step S4). Next, whether the wireless tag 62 stores wireless tag data or not is determined (Step S6). If no wireless tags 62 is attached to the document or no data is written in the wireless tag 62 attached to the document, determination is made that there is no wireless tag data (No in Step S6). In this case, the process goes to Step S12.

In Step S6, if the wireless tag data is stored, in other words, a wireless tag 62 is attached to the document and the wireless tag data has been written in the wireless tag 62 (Yes in Step S6), the wireless tag reader 15 reads the wireless tag data from the wireless tag 62 (Step S8). The data size of the wireless tag data thus read is detected, and the data size is recorded in the transmission wireless tag data size storage area 132 (Step S10). Next, the scanner 22 reads the image data from the original document, and the image data and the wireless tag data read in Step S8 are stored, page by page, as facsimile data 63, in the transmission facsimile data storage area 131 (Step S12).

Then, whether all pages of the original document have been read or not is determined (Step S14). If all pages have not been read (No in Step S14), the process returns to Step S2.

The original document is read, page by page. When all pages are read (Yes in Step S14), the size of the largest wireless tag data ever read (Step S16) is determined, referring to the wireless tag data size storage area 132. Then, the wireless tag data and the image data are read from each storage area and combined with each other, to generate facsimile data 63 (see FIG. 3B), page by page (Step S18). For the facsimile data 63 thus generated, there has been prepared the wireless tag data region 64 that can store the wireless tag data of the largest size determined in Step S16. In the facsimile data 63 of the page in which the wireless tag data is detected, this wireless tag data is stored in the wireless tag data region 64. Note that the facsimile data 63 is stored page by page, in a transmission buffer (not shown) provided in the RAM 13.

The document consists of pages in which a wireless tag data has been detected and pages in which no wireless tag data has been detected. In this case, only the dummy data is stored in the wireless tag data region 64 with respect to the pages in which no wireless tag data has been detected. If no wireless tag data has been detected in any page of the document, size "0" is set as maximum size for the wireless tag data, and the facsimile data 63 does not have the wireless tag data region 64.

Figure 6:
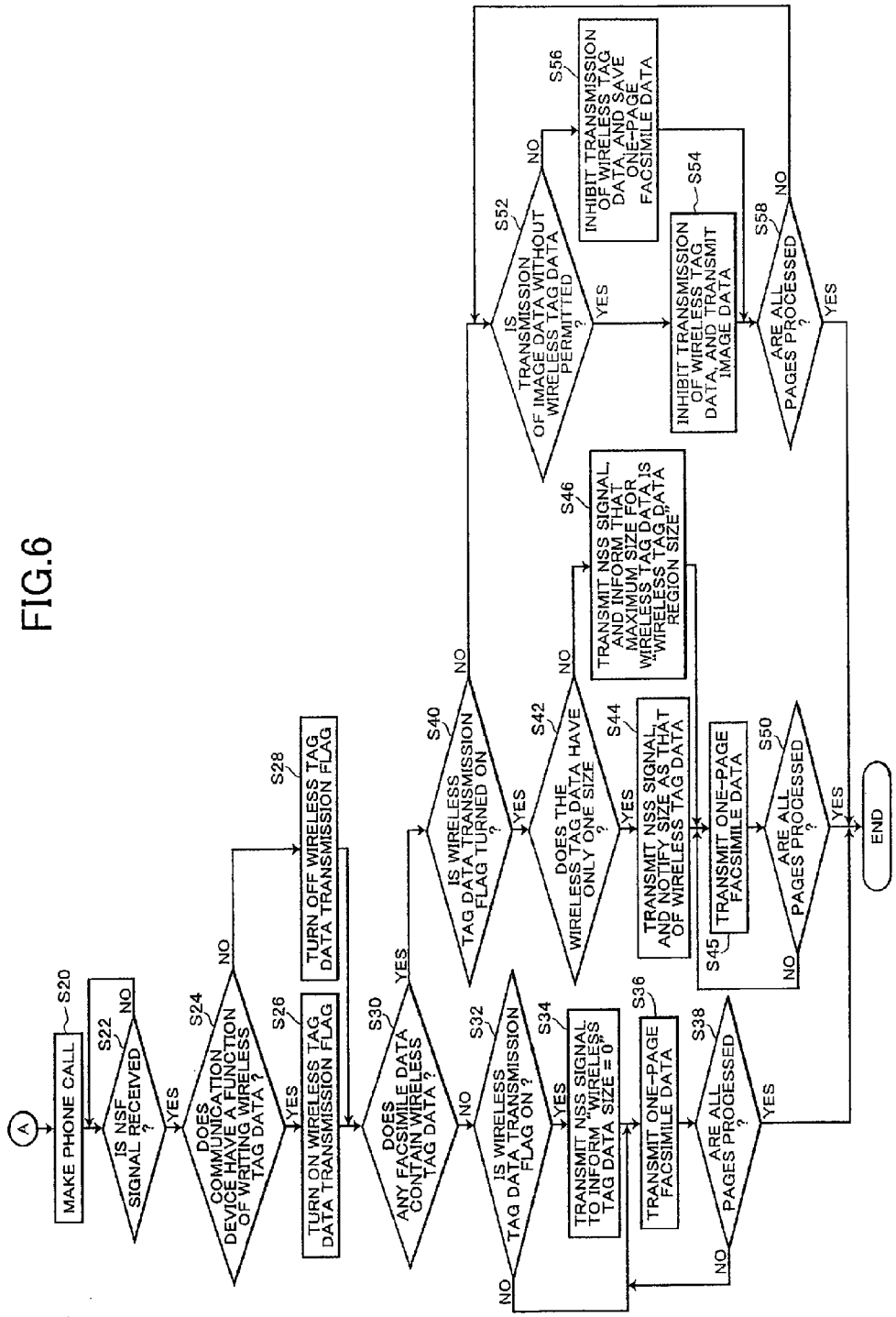
FIG. 6 is a flowchart showing a latter part of the procedure shown in FIG. 5.

The facsimile-data transmission will be further explained, with reference to FIG. 6.

First, a phone call is made (Step S20) to initiate communication with the communication device 60. Then, whether an NSF signal has arrived from the communication device 60 or not is determined (Step S22). The NSF signal is a facsimile-control signal to transmit from a receiving apparatus to a transmitting apparatus. More precisely, the NSP signal is sent from the communication device 60 to inform the facsimile device 1 that the device 60 has a non-standard function provided by the manufacturer of the apparatus 60. If the facsimile device 1 does not receive the NSF signal (No in Step S22), the process is suspended. When the NSF signal is received (Yes in Step S22), whether the communication device 60 has the function of writing wireless tag data into a wireless tag is determined based on the received NSF signal (Step S24).

If the communication device 60 has the function of writing data into the wireless tag (Yes in Step S24), the wireless tag data transmission flag 133 is turned on (Step S26). If the device 60 does not have the function of writing data into the wireless tag (No in Step S24), the wireless tag data transmission flag 133 is turned off (Step 328).

Then, whether any facsimile data 63 to be transmitted contains wireless tag data or not is determined (Step S30), referring to the transmission wireless tag data size storage area 132. If any facsimile data 63 contains no wireless tag data (No in Step S30), whether the wireless tag data transmission flag 133 is turned on or not is determined (Step S32). If the wireless tag data transmission flag 133 is turned on (Yes in Step S32), an NSS signal is transmitted to the communication device 60 (Step S34). Note that the NSS signal is a facsimile-control signal to be transmitted from a transmitting apparatus to a receiving apparatus, to inform the receiving apparatus that the transmitting apparatus has non-standard functions.

The facsimile device 1 according to this embodiment transmits the NSS signal to the communication device 60 to inform the device 60 of the size information that represents the size 64 of the wireless tag data contained in the facsimile data 63 (see FIG. 3B). In this instance, the facsimile data 63 does not contain wireless tag data. Therefore, the NSS signal is transmitted to inform that "wireless tag data size=0" (Step S34).

If the wireless tag data transmission flag 133 is turned off (No in Step S32), Step 34 is skipped.

Next, the one-page facsimile data 63 stored in the transmission facsimile data storage area 131 is read and transmitted (Step S36). This facsimile data 63 to be transmitted represents the wireless tag data size 64 that is "0." That is, the data 63 is facsimile data containing no wireless tag data.

Step S36 is repeated until all pages have been processed (No in Step S38). When all pages are processed (Yes in Step S38), the facsimile transmission is terminated. Thus, the image data read by the scanner 22 is transmitted in the same way as in the ordinary facsimile transmission if the wireless tag data is not detected from the original document 61.

If the facsimile data 63 contains the wireless tag data (Yes in Step S30), Steps S40 to S58 are performed, so that the image data and the wireless tag data are processed in accordance with whether the wireless tag data transmission flag 133 is turned on or off.

At first, whether the wireless tag data transmission flag 133 is turned on or not is determined (Step S40). If the wireless tag data transmission flag 133 is turned on (Yes in Step S40), whether the wireless tag data has only one size or not is determined (Step S42), referring to the data size stored in the transmission wireless tag data size storage area 132.

If the wireless tag data has only one size (Yes in Step S42), an NSS signal is transmitted to the communication device 60 to inform the device 60 of the size of the wireless tag data (Step S44). If the wireless tag data does not have only one size (No in Step S42), the NSS signal is transmitted to the communication device 60, thereby informing the device 60 of the maximum data size (Step S46). Thus, the size of the wireless tag data region 64 can be notified to the communication device 60.

Thus, the information representing the size of the wireless tag data region 64 is transmitted to the communication device 60, before the facsimile data 63 is transmitted. Therefore, the communication device 60 can process the image data and the wireless tag data in accordance with the size of the wireless tag data region 64, which has been notified to the device 60.

Next, one-page facsimile data 63 is transmitted (Step S48). The facsimile data 63 transmitted at this time is composed of image data and wireless tag data that are associated for each page of the original document, the wireless tag data being stored in the wireless tag data region 64.

Step S48 is repeated until all pages are processed (Step S50). When all pages are processed (Yes in Step S50), the facsimile-data transmission is terminated.

When the facsimile data 63 contains wireless tag data (Yes in Step S30), and the wireless tag data transmission flag 133 is turned off (No in Step S40). The operation of the facsimile device 1 will be explained. If the wireless tag data transmission flag 133 is turned off, that is, if the communication device 60 does not have the function of writing wireless tag data, the transmission of the wireless tag data from the facsimile device 1 to the communication device 60 is inhibited. This operation can prevent errors in the device 60 which may be caused when the wireless tag data is transmitted to the device 60 that cannot process the wireless tag data.

Then, determination is made whether any transmission of the image data without the wireless tag data is permitted (Step S52). The determination is made in the facsimile device 1, in accordance with the instruction made by the user or the instruction recorded in the wireless tag data.

That is, the image data may be transmitted without the wireless tag data, depending on the content of the wireless tag data and the image data. In this case, if the image data is transmitted without wireless tag data, the read image data is not wasted at all, increasing the operating efficiency.

If the wireless tag data contains important data, it is not desirable to transmit the image data alone without the wireless tag data. Hence, in the facsimile device 1 according to this embodiment, whether the image data should be transmitted along is determined in accordance with the user's instruction.

If the transmission of the image data without the wireless tag data is not permitted (No in Step S52), the transmission of the wireless tag data of the page is inhibited, and the one-page facsimile data 63 is saved in the transmission-data memory 141, in association with the facsimile number of the communication device 60 (Step S56). This operation prevents the wasting of the image data read by the scanner 22. In this case, only the image data is saved in the transmission-data memory 141 instead of the facsimile data 63. Accordingly, retransmission of the image data can be avoided.

On the other hand, if the transmission of the image data without the wireless tag data is permitted (Yes in Step S52), the transmission of the wireless tag data is inhibited and the image data is transmitted (Step S54). In other words, only the image data is transmitted, not in association with the wireless tag data. In this case, only the page whose transmission is not permitted is saved in the transmission-data memory 141. The storage capacity of the memory can therefore be saved.

Until all pages are processed (Step S58), the process starting from step 52 are repeated. When all pages are processed (Yes in Step S58), the facsimile transmission is terminated.

If a wireless tag 62 is attached to the original document 61, the image data and the wireless tag data, which are associated with each other, can be transmitted in mutual association.

The image data and the wireless tag data are processed, depending on whether the communication device 60 has the function of writing wireless tag data. Hence, data can be appropriately transmitted, irrespective of the type of the communication device 60.

Facsimile reception of the facsimile device 1 will be explained with reference to FIG. 7. The facsimile reception is a process that is started when a phone call arrives at the facsimile device 1 to initiate communication between the facsimile device 1 and the transmission-source facsimile device (not shown).

First, an NSF signal is transmitted to the transmission-source facsimile device (Step S62). The NSF signal informs the transmission-source facsimile device that the facsimile device 1 has a non-standard function, i.e., the function of writing wireless tag data.

Next, the facsimile device 1 stays in a standby sate until receiving an NSS signal (Step S64). When the facsimile device 1 receives the NSS signal (Yes in Step S64), the size information contained in the NSS signal is acquired and stored in the size information storage area 135 (Step S68).

Next, the sensor 54 (see FIG. 1) detects the vacant storage capacity of the wireless tag 72 attached to the recording sheet 71 set in the sheet-feeding trays 51, 52 and 53 (Step S70). The detected vacant storage capacity is compared with the size of the wireless tag data region to determine whether recording sheets 71 on which data of a size corresponding to the vacant storage capacity can be printed are available. In other words, whether the sheet-feeding trays 51, 52 and 53 accommodate the recording sheets 71 on which the wireless tag data for one page can be printed or not is determined (Step 372).

If the sheet-feeding trays 51, 52 and 53 do not accommodate the recording sheets 71 on which the wireless tag data for one page can be printed (No in Step S72), a DCN signal is transmitted from the facsimile device 1 to the transmission-source facsimile device (Step S74), and the facsimile data-reception is terminated in the facsimile device 1. Upon receiving the DCN signal, the transmission-source facsimile device interrupts the data transmission. Hence, the facsimile device 1 receives no more data from the transmission-source facsimile device. This operation prevents the facsimile device 1 from becoming so-called memory-full state, due to the accumulation of wireless tag data than can be no longer written in the device 1.

The sheet-feeding trays 51, 52 and 53 may hold recording sheets 71 on which the wireless tag data for one page can be printed (Yes in Step S72). In this case, the facsimile device 1 receives one-page facsimile data 63 from the transmission-source facsimile device. The one-page facsimile data 63 is stored in the facsimile data storage area 134 (Step S76). Then, whether all pages have been received or not is determined (Step S78). Step S76 is repeated until as all pages are received (No in Step S78). If the facsimile data 63 contains wireless tag data, the received data including the wireless tag data is stored in the facsimile data storage area 134.

When the facsimile data 63 for all pages are received (Yes in Step S78), the process goes to the sequence shown in FIG. 8.

Referring to FIG. 8, whether the size of the wireless tag data region is "0" or not is determined (Step S82). If the wireless tag data region has size "0" (Yes in Step S82), that is, if the received facsimile data 63 contains no wireless tag data, whether any recording sheet 71 having no wireless tag 72 is available or not is determined (Step S84). If the recording sheet 71 having no wireless tag 72 are available (Yes in Step S84), such a recording sheet 71 is selected (Step S86).

If the recording sheets 71 having no wireless tag 72 is not available (No in Step S84), a recording sheet 71 with a wireless tag 72 having the minimum storage capacity is selected (Step S88). This operation prevents the wasteful use of recording sheets 71 each having a wireless tag 72 having an unnecessarily large capacity.

If the wireless tag data region may not have size "0" (No in Step S82), that is, if the received facsimile data 63 has a wireless tag data region 64, whether recording sheets 71 are available in several types each having a wireless tag 72 that has vacant storage capacity equal to or larger than the size of the wireless tag data region or not is determined (Step S90).

If recording sheets 71 are available in several types each containing a wireless tag 72 that has vacant storage capacity equal to or larger than the size of the wireless tag data region (Yes in Step S90), a recording sheet 71 having a wireless tag 72 of the smallest vacant storage capacity is selected (Step S92). Thus, a recording sheet 71 can be selected, in which the wireless tag data is reliably written for one page, while preventing the wasteful use of recording sheets 71.

If recording sheets 71 are available in only one type containing a wireless tag 72 that has vacant storage capacity equal to or larger than the size of the wireless tag data region (No in Step S90), this type of recording sheet 71 is adopted for recording (Step S94).

Then, the recording sheet 71 adopted in step S86, S88, S92 or S94 is fed from the sheet-feeding tray 51, 52 or 53 to the wireless tag data writing position (Step S96). The wireless tag data contained in the one-page facsimile data 63 is identified based on the size of the wireless tag data region (Step S98). The wireless tag writer 16 writes the wireless tag data for one page into the wireless tag 72 attached to the recording sheet 71 (Step S100).

Next, the laser printer 30 forms an image on the recording sheet 71 by using the image data contained in the facsimile data 63 (Step S102). Then, whether all pages of the facsimile data 63 have been processed or not is determined (Step S104). If all pages have not been processed (No in Step S104), the process returns to Step S96, and the process starting from Steps S96 are repeated. If all pages have been processed (Yes in Step S104), the facsimile-data transmission is terminated.

In the facsimile-data reception sequence, the facsimile device 1 can reproduce, page by page, the image printed on the original document 61, which has been transmitted from the transmission-source facsimile device, and the wireless tag data written in the wireless tag 62 attached to the original document 61, on the recording sheet 71 and in the wireless tag 72, respectively.

The present invention has been described with reference to an embodiment. This invention is not limited to the embodiment, nevertheless. Various changes and modifications can be made within the scope and spirit of the invention, as may be obvious to those skilled in the art.

In the facsimile transmission explained with reference to FIG. 6, for example, whether any transmission of the image data without the wireless tag data is permitted or not is determined in accordance with the setting of the facsimile device 1 or the instruction recorded in the wireless tag data (Step S52). Instead, an inquiry may be displayed on the screen of the operation panel, asking the user whether the image data should be transmitted without including the wireless tag data, or should be saved in the transmission-data memory 141, without being transmitted. In this case, the image data is processed in accordance with the answer to the inquiry thus displayed.

In the facsimile device 1 according to the embodiment described above, the size information transmitted represents the size of the wireless tag data region 64. Instead, any size information that can identify the wireless tag data on the basis of the facsimile data 63 may be used. For example, the information representing the size of the wireless tag data may be transmitted, for each page, to the communication device 60.

In the facsimile device 1 according to the present embodiment, the wireless tag reader 15, wireless tag writer 16, scanner 22 and laser printer 30 may be externally provided with respect to the facsimile device 1 through cables.

Of course, the present invention can be applied to a facsimile device that reads image data from original documents placed on a flat bed.

What is claimed is:

1. A communication device, comprising:
   a reading unit that reads image data from an original document, the original document having a wireless tag including wireless tag data, the wireless tag data having data size;
   a wireless tag reading unit that reads the wireless tag data from the wireless tag; and
   a transmitting unit that associates the image data with the wireless tag data to transmit the associated image data and wireless tag data to another device
   a functional information acquiring unit that acquires functional information indicating whether the another device has a function of writing the wireless tag data into a further wireless tag;
   a data-processing unit that processes the image data and the wireless tag data on the basis of the functional information of the another device; and
   a memory, wherein the data-processing unit selects one of a first action and a second action, the first action causing the transmitting unit to transmit the image data, and a second action saving the image data in the memory, and then processes the image data in accordance with the selected action, if the functional information indicates that the another device does not have the function of writing the wireless tag data into the further wireless tag.

2. The communication device according to claim 1, wherein, the data-processing unit associates the image data with the wireless tag data and then causes the transmitting unit to transmit the associated image data and the wireless tag data, if the functional information indicates that the another device has the function of writing the wireless tag data into the further wireless tag.

3. The communication device according to claim 1, further comprising a memory, wherein the data-processing unit prohibits the transmitting unit from transmitting the wireless tag data and saves the image data into the memory, if the functional information indicates that the another device does not have the function of writing the wireless tag data into the further wireless tag.

4. The communication device according to claim 1, wherein the data-processing unit causes the transmitting unit to transmit the image data without associating the image data with the wireless tag data, if the functional information indicates that the another device does not have the function of writing the wireless tag data into the further wireless tag.

5. The communication device according to claim 1, wherein the transmitting unit transmits the wireless tag data prior to the image data when transmitting the wireless tag data.

6. The communication device according to claim 1, wherein the transmitting unit associates the image data with the wireless tag data on a page basis for the transmission, the transmitting unit transmits the wireless tag data prior to transmitting the image data.

7. The communication device according to claim 1, further comprising a data-size notifying unit that notifies the another device of size information including the data size of the wireless tag data.

8. The communication device according to claim 7, wherein the transmitting unit associates the image data with the wireless tag data on a page basis to transmit the associated image data and wireless tag data, and the data-size notifying unit notifies the size information including a maximum data size of the wireless tag data.

9. A communication device, comprising:
   a receiving unit that receives data including image data;
   an image-forming unit that forms an image on a recording medium based on the image data, the recording medium including a wireless tag having a storage capacity;
   a wireless tag writing unit that writes the wireless tag data into the wireless tag of the recording medium, if the data includes wireless tag data associated with the image data;
   a size-information acquiring unit that acquires the data size of the wireless tag data as size information, if the data includes the wireless tag data
   a wireless tag data identifying unit that identifies the wireless tag data in accordance with the size information;
   a recording-medium detecting unit that detects the storage capacity of the wireless tag; and
   a recording-medium selecting unit that selects the recording medium which is suitable for forming the image and writing the wireless tag data in accordance with the storage capacity detected by the recording-medium detecting unit and the size information.

10. The communication device according to claim 9, wherein the receiving unit receives a plurality of pages, each of the plurality of pages including the image data, the size-information acquiring unit acquires the size information indicating a maximum data size of the data size of the plurality of pages.

11. The communication device according to claim 9, wherein, the recording-medium selecting unit selects one of the recording medium having no wireless tag and the recording medium having the wireless tag having a minimum storage capacity, if the size information indicates that the data does not include the wireless tag data.

12. The communication device according to claim 9, further comprising:
   a recording medium determining unit that determines whether the wireless tag of the recording medium has the storage capacity for writing all the wireless tag data, on the basis of the size information; and
   a receiving refusing unit that refuse the receipt of the data by the recording unit, if the recording medium determining unit determines that the wireless tag of the recording medium does not have the storage capacity for writing all the wireless tag data.

* * * * *